United States Patent Office 3,606,913
Patented Sept. 21, 1971

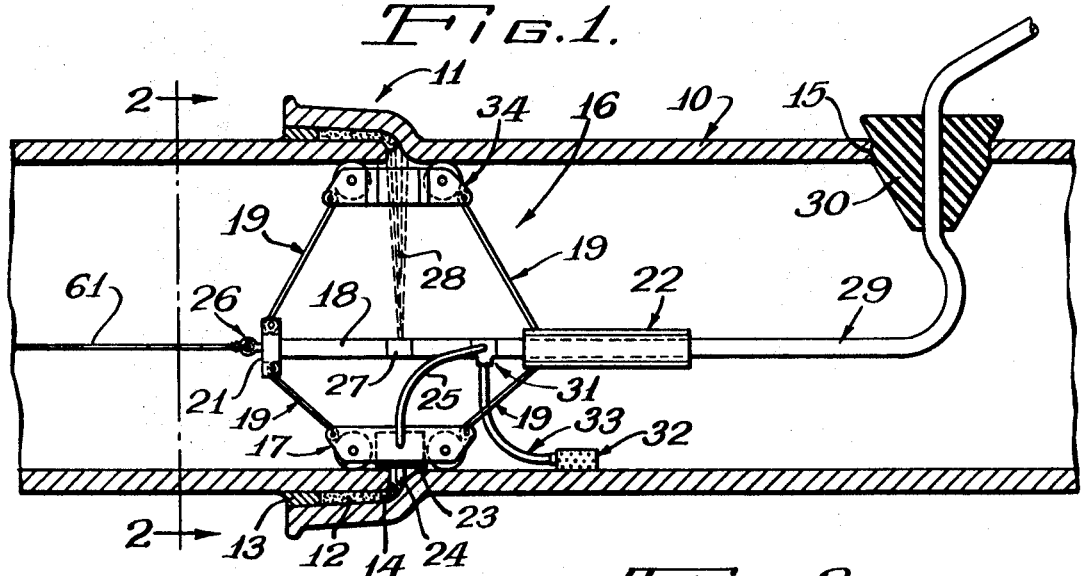
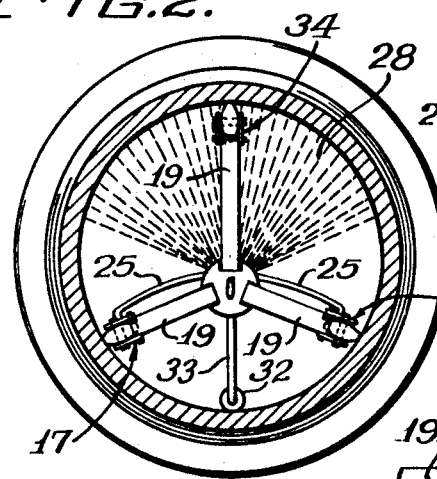
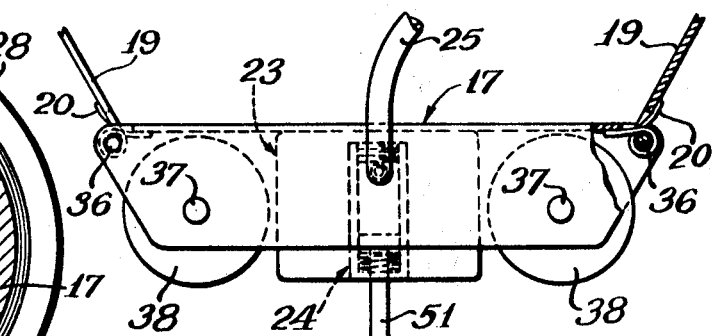
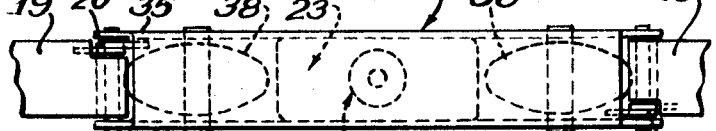
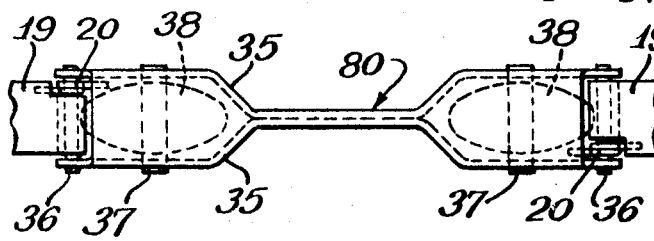
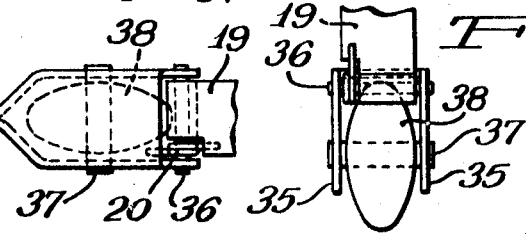

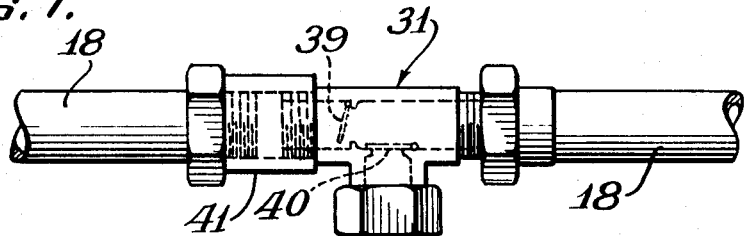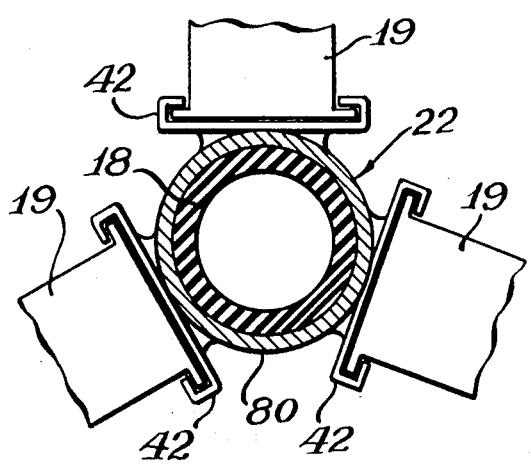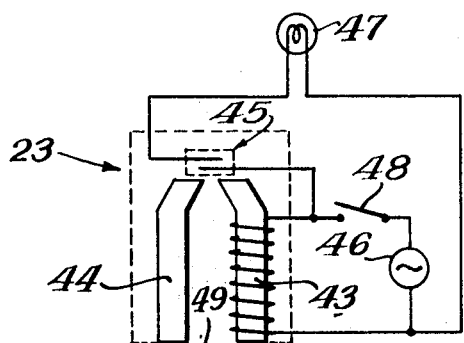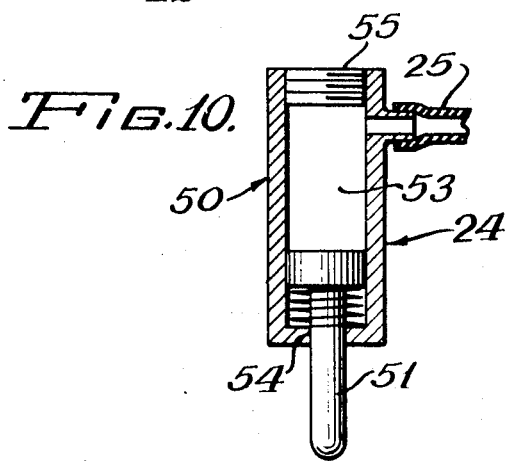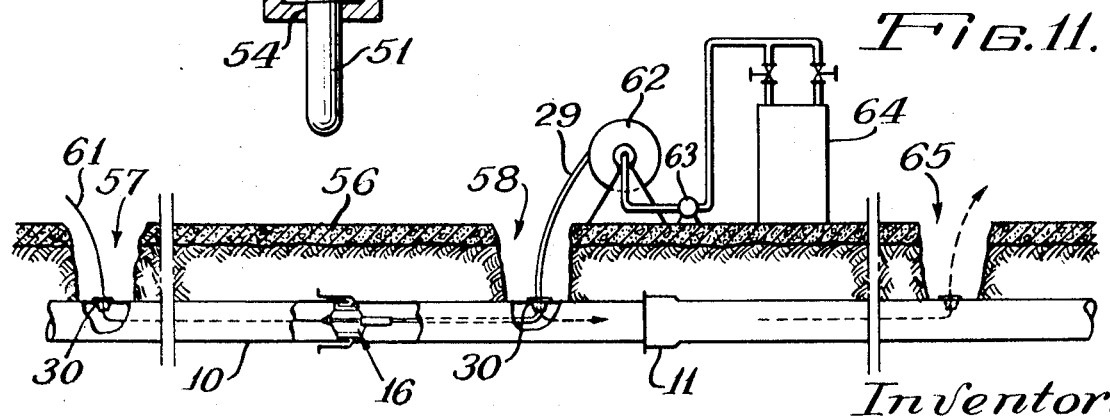

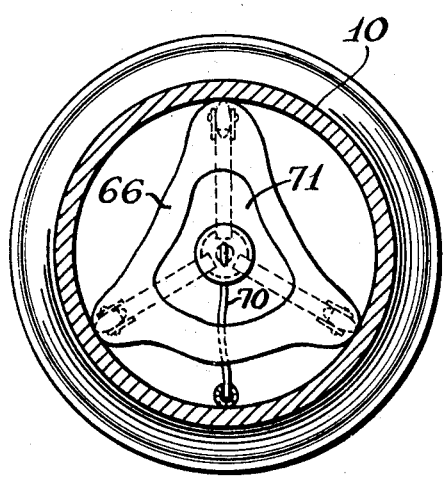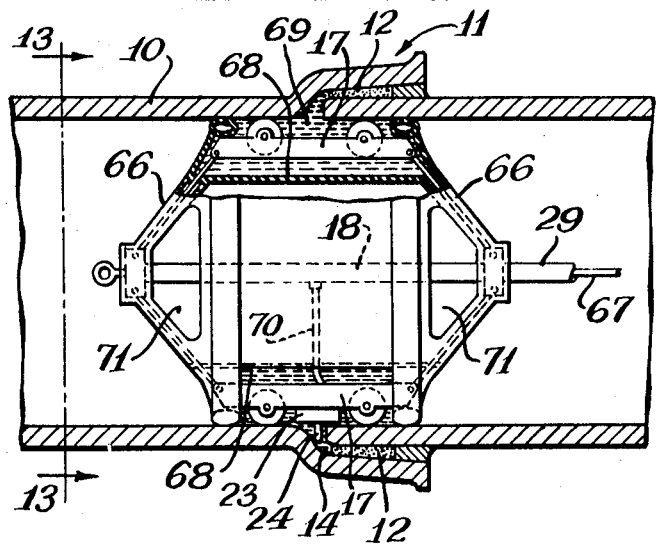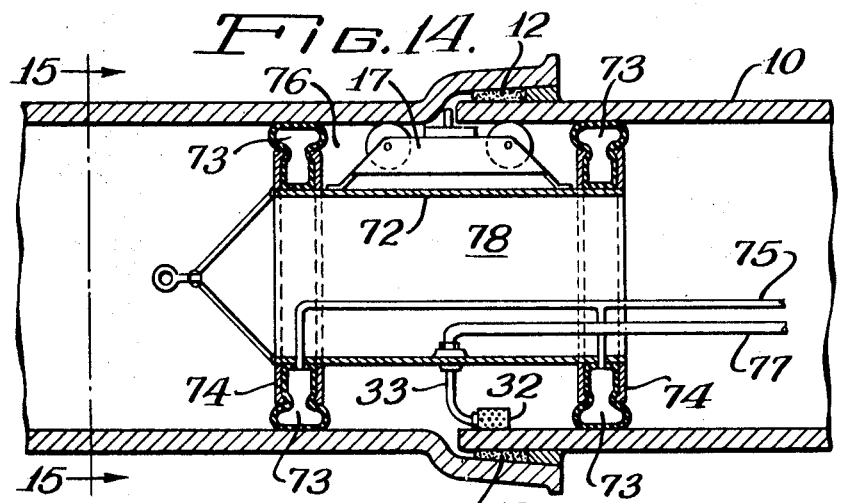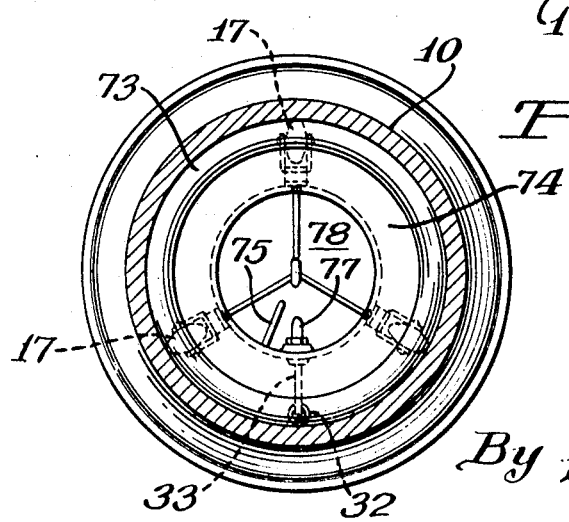

3,606,913
APPARATUS FOR INTERNALLY SEALING PIPES
Gene G. Yie, Chicago, Ill., assignor to
Institute of Gas Technology
Filed Dec. 13, 1968, Ser. No. 783,531
Int. Cl. F16l 55/18
U.S. Cl. 138—97          8 Claims

ABSTRACT OF THE DISCLOSURE

A novel apparatus and method for internally sealing leaking joints in pipelines which contemplates the use of a collapsible apparatus which can be inserted into, and travel within, the pipeline. The apparatus includes an electrical gas-locating means, locking means for locking the apparatus over a gap, and a sealing material-applying means for directly applying the sealing material to the located gap while the apparatus is in locked position over the gap.

Background of the invention

This invention relates to a novel device and method for internally sealing pipelines. More particularly, the invention relates to an apparatus and method for internally sealing pipelines by the insertion of a mobile unit into the pipeline to locate gaps therein and to apply a sealing material to the gaps so located.

There is frequently a need for an apparatus and method for internally sealing pipelines in which a leaking joint has been developed. Examples of such situations are the repairing of subterranean conduits such as sewer lines and gas mains which are buried underground.

Of particular importance is the repair and maintenance of cast iron gas distribution mains. At present there are over 100,000 miles of cast iron gas distribution mains in service in the United States. Such a system represents an investment of many millions of dollars by the gas industry. The cast iron mains are characteristically long-lasting and require a minimum of maintenance. Therefore, the existing gas distribution system has a useful life of many more years. However, the numerous bell and spigot joints in the cast iron gas distribution mains represent vulnerable points in the system in that leakages may develop at these joints due to thermal expansion and contraction of the mains, soil movements and traffic vibrations. When the gas main is used to convey dry natural gas, the packing may lose moisture and become dried and loosened. Clearly, these leakages must be repaired. The rising demand for higher gas distribution pressures to meet the rising needs in cities for natural gas further aggravates the vulnerable points in the cast iron gas distribution systems. Thus, there is a real need for an efficient, effective and economical method and apparatus for the repair and maintenance of the existing cast iron gas distribution mains.

The most commonly employed method presently in use for the repair of cast iron gas distribution mains is the external clamping method. This method includes the steps of excavation to expose the buried gas mains, repairing and resealing the joints or leaks, and repaving to return the street to its original condition. Aside from the relatively high cost per joint repaired by this method, the extensive excavation and repaving required by the method represent a public nuisance since they disrupt traffic.

There have been prior attempts to develop an apparatus and method for sealing pipes internally. See, Cook et al. Pat. 2,984,539 and Cook Pat. 3,273,054. However, these devices require a large amount of time and relatively skilled labor to operate, they require a relatively large hole for insertion into the gas main, and they are not suitable for use in a live gas main.

It is accordingly, an object of the present invention to provide a novel apparatus and method for internally sealing pipelines.

It is another object of the present invention to provide an apparatus and method for internally sealing joints and leaks in subterranean pipelines which places a minimum reliance on the judgment and manual operation of the user.

It is a further object of the invention to provide an apparatus and method for internally sealing pipelines which is capable of directly applying a sealing material to the joints and leaks in the pipeline while permitting the pipeline to continue in its normal operation.

These and other objects of the invention can be gathered from a reading of the disclosure herein.

Summary of the invention

In accordance with the present invention, I provide an apparatus for internally sealing leaking joints and cracks in pipelines which can be collapsed and inserted into the pipeline through a small hole, and operated when the pipeline is in its normal use. The apparatus of the invention includes an electrical gap locating means, locking means for locking the apparatus over a gap and sealing material-applying means for directly applying the sealing material to the located gap while the apparatus is in the locked position over the gap.

The apparatus is mounted on trolleys or other suitable means for traveling within the pipeline. A central shaft is connected to the trolley means by support means which are attached to spring means. The spring-mounted support means can be collapsed against the shaft during insertion of the apparatus into the pipeline. The collapsed apparatus requires a relatively small hole for its insertion and thus the gas main can be left in operation while a small hole is temporarily made to insert the apparatus. After the insertion, the hole can be covered by any convenient means such as a rubber plug. It should be noted that the size of the hole for inserting the apparatus is important in determining whether the pipeline can continue to supply gas during the insertion of the apparatus. After the insertion, the spring means will cause the apparatus to expand to a size corresponding to the internal cross-sectional area of the pipeline. The apparatus then travels along the pipeline until a gap is located by the electrical means. After the gap is located, the apparatus is locked over the gap by the locking means. An application means, such as a spray nozzle, is positioned on the shaft in a fixed relationship to the locking means so that a sealing material can be directly and positively applied by the application means to the gap or joint located. A supply line for the sealing material is attached to the central shaft and communicates with the exterior the pipeline via the opening through which the apparatus is inserted into the pipeline. A siphoning means may also be attached to the shaft to remove excess sealing material applied to the joint or gap.

Brief description of the drawings and the preferred embodiments

The invention will be further described in detail with reference to the drawings, in which:

FIG. 1 shows a front elevation view, partly in section, of a pipeline containing an apparatus according to the present invention;

FIG. 2 is an end elevation view along line 2—2 of FIG. 1;

FIG. 3 is a detailed view showing the lower trolleys of the apparatus of FIG. 1;

FIG. 4 is a partial top plan view of the trolleys shown in FIG. 3;

FIG. 5 is a partial front elevation view of the trolleys of FIG. 3;

FIG. 6 is a partial top plan view of the upper trolley of the apparatus of FIG. 1;

FIG. 7 is a detailed view showing the check valve in the apparatus of FIG. 1;

FIG. 8 is another detailed view showing the slidable attachment of the trolley supports to the rear of the central shaft of the apparatus of FIG. 1;

FIG. 9 is a schematic circuit diagram showing the operation of the electrical gap locating means of the apparatus of the invention;

FIG. 10 shows one embodiment of the locking means of the apparatus of the invention;

FIG. 11 is a schematic view showing the apparatus of the invention in operation;

FIG. 12 is a view similar to FIG. 1 showing another embodiment of the apparatus of the invention;

FIG. 13 is an end view of the apparatus of FIG. 12, along line 13—13;

FIG. 14 is another view similar to FIG. 1, showing a further embodiment of the apparatus of the invention; and FIG. 15 is an end view of the apparatus of FIG. 14, along line 15—15.

Referring now to FIG. 1, a cast iron gas main is generally shown at 10. Gas main 10 has a plurality of bell-and-spigot joints 11 which were originally sealed with a jute packing 12 and caulked with lead or cement shown at 13. The sealed joint shown in FIG. 1 now has a gap 14. To seal this gap 14, an opening 15 is made on the gas main 10 for the insertion of an apparatus of the invention, which is generally indicated at 16.

Apparatus 16 has three trolley means 17 (see FIG. 2) for traveling within the pipeline and for maintaining an upright position. The central shaft 18 is mounted on the trolley means through support means 19. Support means 19 may be conveniently made of steel strips and they are attached at one end to the trolley means 17 through spring means 20 (see FIG. 3). Spring means 20 exerts pressure on the trolley means 17 and on the support means 19 to maintain them in relationship shown in FIGS. 1 and 3. However, spring means 20 can be compressed to permit support means 19 to rotate into a position substantially parallel to the central shaft 18 to thus collapse the apparatus during its insertion into the pipeline. The end of support means 19 not connected to the trolley means is attached to the central shaft 18 either through the front plate 21 or a slotted sleeve 22. The construction of the slotted sleeve 22, which will be discussed in detail in connection with FIG. 8 below, permits those supporting means 19 connected thereto to slide in its axial direction during the collapse of the apparatus 16.

On at least one of the two bottom trolleys 17, and preferably on both of the bottom trolleys, there is attached an electrical means 23 for locating gaps in the pipeline. Immediately adjacent the electrical gap locating means 23, there is provided a locking means 24. The form of the locking means 24 shown is operated by a fluid pressure which is supplied through a hose 25. The operation of the electrical means 23 for locating gaps in joints and the locking means 24 will be described in detail below.

In the front the central shaft 18 there is provided a loop 26 to facilitate the pulling of the apparatus within the pipeline. A front plate 21 is mounted on the central shaft immediately adjacent loop 26 for attachment to support means 19, as described above. Near the center of the central shaft 18, there is provided a spray nozzle means 27 for applying a sealing material to the gap located. The spray nozzle 27 is so positioned on the central shaft 18 that when the apparatus 16 is locked over a gap by locking means 24, the spray nozzle will direct a spray 28 of the sealing material directly onto the gap located. As can be seen from FIG. 2, the spray pattern 28 forms an angle somewhat less than 180°, say 140°. In this manner, the sealing material is applied to the top of the pipe joint and allowed to run down along the wall of the pipe to cover the entire circular joint. This type of spraying is preferred over a nozzle which will produce a spray pattern 360° around a central shaft since a 360° spray pattern would cause the sealing material to be sprayed onto the electrical means 23, locking means 24, and other parts of the apparatus located below the central shaft 18. The deposit of the spray on the top trolley means is minimized by its construction as shown in FIG. 6.

The apparatus 16 communicates with a source of the sealing material externally of the pipeline through hose 29, which emerges from the pipeline through a rubber plug 30 placed in hole 15 to make the gas main airtight during the repairing operation. Hose 29 is connected to the slotted sleeve 22, a check valve 31, and the spray means 27. The check valve 31, which will be described in detail in FIG. 7 below, permits a reversible motor (located outside of the pipeline) to either supply the sealing material to the spray means 27 or to withdraw excess sealing material by a siphoning action through a filter 32 which is positioned near the lowest point in the pipeline (see FIG. 2). Filter 32 is connected to the check valve by conduit 33. The filter serves to prevent foreign material which may be present in the pipeline from entering the conduit 33 or contaminating the sealing material.

The construction of the lower trolleys 17 is shown in detail in FIGS. 3 and 5. Each trolley means 17 is composed of two elongated vertical side plates 35 spaced apart and held in position by bolts 36 and axles 37. Support means 19 are rotatably attached to the trolley means through bolts 36. A spring 20 (see FIG. 3) is attached to both plate 35 and support means 19 to maintain the two parts in a relative position shown in FIG. 1. When the trolley means is pressed towards the central shaft during the insertion of the apparatus into the pipeline, springs 20 would yield and permit support means 19 to rotate to a position nearly parallel that of the central shaft 18. Wheels 38 are mounted between the two plates 35 of a trolley means through the axle pins 37. Wheels 38 may be conveniently made of nylon or other synthetic material. The electrical means 23 is also mounted between the two plates 35. The locking means 24 is mounted adjacent to the electrical means 23.

FIG. 6 shows a partial top plan view of the top trolley means 34 shown in FIGS. 1 and 2. As can be gathered by comparing FIGS. 4 and 6, the construction of the top and bottom trolley means 17 are generally similar except that the top trolley means does not carry the electrical means 23 and the locking means 24. Since the spray pattern 28 (see FIGS. 1 and 2) contacts the top trolley means 34, at the region 80 of such contact the vertical side plates 35 are bent and brought together to present a minimum single surface in the path of the spray pattern 28.

FIG. 7 shows one embodiment of check valve 31 of the apparatus in FIG. 1. In this embodiment, the check valve 31 is shown to have two valve members 39 and 40 in the path of flow leading to the spray means 27 and the filter 32, respectively. When the pump is pumping the sealing material into the apparatus, valve 39 will be in an open position and valve member 40 will be in a closed position to permit the sealing material to pass into central shaft 18 which leads to the spray means 27. When the pump is electrically reversed to exert a siphoning action on the apparatus, valve member 29 will be in closed position and valve member 40 will open to permit the siphoning of excess sealing material via the filter 32 and conduit 33. For reasons of simplicity, the hose 25 for conveying fluid pressure for the operation of the locking means 24 (see FIGS. 1–3) is not shown in FIG. 7. Hose 25 can be easily attached to the check valve, for example, by replacing the pipe coupler 41 with a T-shaped pipe joint.

FIG. 8 shows a cross sectional view of one embodiment of the slotted sleeve 22 and the attachment of trolley support means 19 thereto. Slotted sleeve 22 is made of a pipe 80 having mounted thereon 3 T-slots 42 for receiving the support means 19. The ends of the support means 19 are shaped to be received into the T-slots 42 and for sliding therewithin. In this manner, the support means 19 can slide in the T-slots 42 during the collapsing of the apparatus of the invention.

Referring to FIG. 9, the circuit diagram for the electrical gap locating means 23 is generally shown. In this figure, the electrical gap locator is positioned over a gap 14 which has been developed in a joint in the gas main 10 previously packed with a jute packing 12. The electrical gap locator 23 is made of a ferrous core inductor 43, a ferrous rod 44, and a Reed switch 45 positioned as shown in FIG. 9. An arc current supplied by a power source 46 is fed to the inductor 43 so that an electromagnetic field is generated through the ferrous core of the inductor. When the electrical gap locator 23 is positioned at a point in the gas main where there is no gap, a flux generated by the inductor 43 will pass through the pipe wall 10 and ferrous rod 44 to form a loop thus causing the Reed switch 45 to close. The Reed switch 45 is connected electrically through a cable in hose 29 to an indicator light 47, the power source 46, and a control switch 48, all of which are located on ground surface outside the gas main. Thus, when the electrical gap locator 23 is not directly on a gap, the indicator light 47 will be lit. When the ferrous rod 44 and the inductor 43 of the electrical gap locator 23 are positioned across a gap, as shown in FIG. 9, the flux path will be broken or the flux density will be so drastically reduced that the Reed switch 45 will be open to thus open the circuit and turn off the indicator light 47. The operator of the apparatus, seeing that the light 47 is off, will know that the apparatus is positioned over a gap in the gas main. The apparatus is then stopped to position it over the gap. It may be necessary to rock the apparatus back and forth slightly to position the apparatus over the gap.

It will be appreciated from the foregoing that the electrical gap locating means of the present invention functions positively in locating a gap within the pipeline. This is in distinct contrast to a detection means where the increase in mass at a pipe joint, due to the double thickness of the pipes at the joint, is detected. A change-in-mass detecting means will call attention to practically every joint in the pipeline without the ability to determine whether or not a gap exists at that joint.

A section view of the locking means 24 is shown in FIG. 10. In this figure, the locking means is shown to be made of a housing 50 having a piston shaped locking pin 51 mounted in a chamber 53 therein. Locking pin 51 can protrude to the exterior of the chamber 53 and housing 50 through passage way 54. A plug 55 closes another passage way through which the locking pin 51 is inserted into the chamber 53. Chamber 53 is in communication with the check valve 31, hose 29 and the pump for the sealing material through hose 25. After the electrical gap locator means 23 has located a gap in the gas main, the pump above the ground is turned on to supply pressure for the sealing material. This pressure works against a biasing spring 52, which normally keeps the locking pin 51 in a retracted position within chamber 53, to force locking pin 51 to project beyond the housing 50. In this manner, the locking pin 51 is forced into the gap 14, shown in FIG. 1.

It will be appreciated from the foregoing that the particular embodiment of the locking means 24 shown in FIG. 10 will only lock the apparatus over a gap when the pump for the sealing material is in operation and supplying fluid pressure to the apparatus. After a gap has been sprayed with the sealing material, the pump will be stopped and the pressure in chamber 53 of the locking means will be released to permit biasing spring 52 to retract the locking pin 51 back into housing 50. Although the locking means 24 can be made to be electrically actuated, I prefer to keep the apparatus as simple as possible.

The operation of the apparatus of the invention is schematically shown in FIG. 11. In FIG. 11, a gas main 10 having a number of joints 11, is shown buried under the ground surface 56. To repair gaps in gas main 10, two excavations 57 and 58 are made several hundred feet apart. These excavations expose portions of gas main 10 so that a hole can be made thereon. Since the hole required for the insertion of the apparatus of the invention is releatively small, the hole can be made on a live gas main and immediately sealed by the use of a plug such as a rubber plug during the repairing operation. Thus, the gas main can be left in its normal use of transporting gas. At excavation 57, a hole 59 is made on the gas main 10 and a plug 60 is inserted into the hole 59 to minimize escape of gas from the main. A long and flexible spring 61 is inserted into the gas main through plug 60 and travels to the vicinity of the excavation 58. At excavation 58, a hole 15 is made on the gas main and a rubber plug 30 is inserted therein to minimize the loss of gas therefrom. Spring 61 can be retrieved from gas main 10 through hole 15 and attached to the front loop 26 (see FIG. 1) of the apparatus 16 of the invention. The apparatus is then inserted into the gas main, attached to spring 61 and in a collapsed condition, through hole 15. After insertion, the apparatus expands into the configuration shown in FIG. 1 and is ready for locating and sealing gaps within the gas main. The apparatus is pulled by the spring line 61 from excavation 58 towards excavation 57. The hose 29 is unwound from a spool 62 and is connected to a container 64 for the sealing material through a reversible pump 63. After the portion of the gas main between excavations 57 and 58 has been repaired, the process can be repeated between excavation 58 and another excavation 65 in the opposite direction.

FIG. 12 shows another embodiment of the apparatus of the invention. In this embodiment, the apparatus is generally as shown in FIG. 1 except that a rubber diaphragm 66 is mounted on each end of the apparatus as shown. The rubber diaphragms 66 are connected via a conduit 67 to a source of air pressure located externally of the gas main. When using this embodiment of the apparatus, the gap is first located and the apparatus locked over the gap and the air pressure is then supplied to the rubber diaphragms 66. The air pressure causes the diaphragms 66 to expand and to form an enclosed space with a rubber ring 68 which is concentric with gas main 10 and which connects the two diaphragms 66. This enclosed space 69 surrounds the gap in the gas main. The sealing material is then introduced into space 69 via a hose 70, which may be the same hose as hose 25 (see FIG. 1) but with another outlet directed into the space 69. In this manner, the sealing material is applied to the gap by filling the space 69 and allow the jute packing 12 to absorb the sealing material. After the sealing material has been in the space 69 for a sufficient period of time, it may be withdrawn by reversing the pump. It will be noted that the apparatus permits the gas to pass through passage ways 71 even when the rubber diaphragms have been inflated.

FIG. 13 shows an end view of the embodiment of the apparatus shown in FIG. 2, except that the ring 68 is not shown for simplicity.

Referring to FIG. 14, another embodiment of the apparatus of the invention is shown. In this embodiment, the trolley means 17 (only the top trolley is shown) are mounted on a metal cylinder 72 having two rubber annular members 73 mounted on its ends. Cylinder 72 is of generally tubular configuration and having a holding means 74 at each end of its exterior surface for holding the annular members 73. Annular members 73 are made of a flexible material such as rubber and are inflatable by air pressure which may be supplied through an air conduit 75. After the apparatus is locked over a gap and the annular members 73 are inflated, an annular space 76 is formed by the walls of gas main 10, cylinder 72 and annular members 73. The sealing material is then pumped into this space 76 via a conduit 77. It will be noted that this embodiment of the apparatus also permits the passage of the gas therethrough by way of passage way 78, even when a joint is being repaired. After a proper period of time, the sealing material is withdrawn from space 76 and the apparatus can be moved on as indicated above. FIG. 15 shows an end view of the apparatus of FIG. 14 along line 15—15.

It will be noted that the apparatus of FIG. 14 is more rigid than the embodiments shown in the previous figures due to the presence of the rigid metal cylinder 72. Thus, as compared to the fill-and-drain apparatus of FIG. 12, the apparatus of FIG. 14 requires a larger opening on the gas main 10 for its insertion or removal. Such a larger opening may require a temporary interruption in the supply of gas by the gas main during the insertion and removal of the apparatus. However, once the apparatus is inserted into the gas main, service can be resumed until the removal of the apparatus. The principal advantage of the embodiment shown in FIG. 14 is that it can withstand considerably higher sealant pressure than the apparatus of FIG. 12. Since the penetration of the gap or the jute packing 12 may depend to certain extent on the sealant pressure, the embodiment shown in FIGS. 12 and 14 can be used to advantage in various particular circumstances.

Any conventional fluid sealing material may be used with the apparatus of the invention. A particularly effective liquid sealant is disclosed in my copending application Ser. No. 644,833, filed June 9, 1967, for "Method for Internally Sealing Gas Main Joints."

The invention has been described in detail with reference to particular and preferred embodiments thereof, but it will be understood that variations and modifications can be effected within the spirit and the scope of the invention as described hereinabove and as defined in the appended claims.

What is claimed is:

1. An apparatus for internally sealing an electrically conductive continuous pipeline, said pipeline having bell and spigot connections therein defining periodic non-electrically conductive gaps in said continuous pipeline, which comprises, in combination: means adapted for traveling within said pipeline; electrical means for locating each of said gaps within said pipeline mounted on said traveling means; said electrical means including means for generating an electromagnetic field having its lines of flux passing through the wall of said pipeline, and means for indicating decrease in density of said lines of flux when said electrical means is passing over each of said gaps; means external of said pipeline responsive to said decrease of flux density for signaling the presence of each of said gaps; locking means mounted on said traveling means for maintaining said apparatus in a fixed position in relation to each gap located by said electrical means; application means mounted on said traveling means for applying a sealing material to said located gap, said application means being positioned for application of said sealing material to said located gap when said locking means is maintaining said apparatus in a fixed position in relation to said located gap; and means for supplying said sealing material to said application means.

2. Apparatus according to claim 1 wherein said traveling means includes a collapsible frame so that said apparatus can be collapsed during ingress and egress of said apparatus into said pipeline.

3. Apparatus according to claim 1 wherein said application means is a spraying means adapted for spraying said sealing material onto each of said gaps.

4. Apparatus according to claim 1 wherein said locking means is a pressure actuatable locking pin, said locking pin communicating with said supplying means so that the fluid pressure in said supplying means will force the pin into said located gap after the gap has been located by the electrical means.

5. Apparatus according to claim 1 further comprising siphon means for the removal and recirculation of excess sealing material.

6. An apparatus for internally sealing an electrically conductive continuous pipeline, said pipeline having bell and spigot connections therein defining periodic non-electrically conductive gaps in said continuous pipeline, the improvement comprising, in combination: an electrical means mounted on said apparatus for locating each of said gaps in said pipeline; said electrical means including means for generating an electromagnetic field having its lines of flux passing through the wall of said pipeline, and means for indicating decrease in density of said lines of flux when said electrical means is passing over each of said gaps; means external of said pipeline responsive to said decrease of flux density for signaling the presence of each said gaps; a locking means mounted on said apparatus for maintaining said apparatus in a fixed and predetermined position with respect to each gap located by said electrical means; annular inflatable diaphragm means mounted on said apparatus in a position so that when said diaphragm means is inflated it will cooperate with the internal wall of the pipeline to enclose an annular space surrounding each of said gaps but permitting the passage of gas through said apparatus; and means for permiting ingress and egress of a sealing material to said enclosed space.

7. Apparatus according to claim 6 wherein said apparatus is collapsible to facilitate the ingress and egress of said apparatus from said pipeline.

8. An apparatus for internally sealing an electrically conductive continuous pipeline, said pipeline having bell and spigot connections therein defining periodic non-electrically conductive gaps in said continuous pipeline, the improvement comprising, in combination: an electrical means mounted on said apparatus for locating each of said gaps in said pipeline; said electrical means including means for generating an electromagnetic field having its lines of flux passing through the wall of said pipeline and means for indicating decrease in density of said lines of flux when said electrical means is passing over each gap; means external of said pipeline responsive to said decrease of flux density for signaling the presence of each of said gaps; a locking means mounted on said apparatus for maintaining said apparatus in a fixed and predetermined position with respect to a gap located by said electrical means; and application means mounted on said apparatus at a point for application of a sealing material to said located gap when said locking means is maintaining the apparatus in said position.

References Cited

UNITED STATES PATENTS

| 3,168,909 | 2/1965 | Zurbrigen et al. | 138—97 |
| 2,940,302 | 6/1960 | Scherbatskoy | 324—34.1 |

CHARLES SUKALO, Primary Examiner

U.S. Cl. X.R.

73—49.1